United States Patent
Bryer et al.

(10) Patent No.: US 6,570,167 B1
(45) Date of Patent: May 27, 2003

(54) APPARATUS FOR TREATING A LIQUID

(76) Inventors: Kenneth Ray Bryer, 101 Couldery Court, Cedar Grove, Queensland (AU), 4285; Devon Brent Greatorex, 35 Sharon Drive, North Maclean, Queensland (AU), 4280; Timothy John Prince, Queen Street, Jimboomba, Queensland (AU), 4280

(*) Notice: Subject to any disclaimer, the term of this patent is extended or adjusted under 35 U.S.C. 154(b) by 0 days.

(21) Appl. No.: 09/600,167
(22) PCT Filed: Jan. 27, 1999
(86) PCT No.: PCT/AU99/00051
  § 371 (c)(1),
  (2), (4) Date: Aug. 2, 2000
(87) PCT Pub. No.: WO99/40032
  PCT Pub. Date: Aug. 12, 1999

(30) Foreign Application Priority Data

Jan. 29, 1998 (AU) .............................. PP1580

(51) Int. Cl.⁷ ................................ C02F 1/32
(52) U.S. Cl. ..................................... 250/431
(58) Field of Search ............. 250/431; 422/186.3; 21/102 R, 54

(56) References Cited

U.S. PATENT DOCUMENTS

| | | | | | |
|---|---|---|---|---|---|
| 3,061,721 A | * | 10/1962 | Al Brenner | ................. | 250/43 |
| 3,456,107 A | * | 7/1969 | Robertson | ................. | 250/431 |
| 3,904,363 A | * | 9/1975 | Free | ................. | 21/102 R |
| 5,227,140 A | * | 7/1993 | Hager et al. | ............... | 422/186.3 |
| 5,266,280 A | * | 11/1993 | Hallett | ................. | 422/186 |
| 5,401,474 A |   | 3/1995 | Hager et al. | ............... | 422/186.3 |
| 5,471,063 A | * | 11/1995 | Hayes et al. | ................. | 210/748 |
| 5,590,390 A |   | 12/1996 | Maarschalkerweerd | .. | 422/186.3 |
| 5,725,757 A | * | 3/1998 | Binot | ................. | 210/85 |
| 5,942,110 A | * | 8/1999 | Norris | ................. | 210/198.1 |

FOREIGN PATENT DOCUMENTS

| | | | |
|---|---|---|---|
| CH | 1669869 A1 | 7/1989 | |
| DE | 2 332 455 | 1/1975 | |
| DE | 2835-571 | 8/1978 | |
| DE | 3710-250 A | 3/1987 | |
| DE | 4225630 A1 | 8/2002 | |
| EP | 0 358 921 | 8/1989 | |
| EP | 0 467 465 A1 | 7/1991 | |
| EP | 648711 A1 | 10/1993 | |
| GB | 1 213 706 | 11/1970 | |
| GB | 2 318 165 A | 10/1996 | |
| JP | 359150589 | * 8/1984 | .............. 204/158.2 |
| WO | WO 9420208 A1 | 3/1993 | |
| WO | WO94/09112 | 4/1994 | |

* cited by examiner

*Primary Examiner*—John R. Lee
*Assistant Examiner*—Anthony Quash
(74) *Attorney, Agent, or Firm*—Hoffman, Wasson & Gitler

(57) ABSTRACT

A cleaning device operates to clean a radiation tube within a housing having an internal passageway. The radiation tube is oriented to have an upper end and a lower end. The cleaning device has liquid flow passages having a surface angled relative to the flow of liquid through the internal passageways. Under the flow of water in the internal passageway, the cleaning device is caused to move from a lower end to an upper end of the tube. Flow through the liquid flow passages causes a rotational motion. When liquid flow ceases, gravity causes the cleaning apparatus to return to the lower end of the tube. Upon this return motion, liquid flow through the liquid flow passages again causes rotational motion.

12 Claims, 1 Drawing Sheet

APPARATUS FOR TREATING A LIQUID

FIELD OF THE INVENTION

This invention relates to an apparatus for treating a liquid and particularly relates to an apparatus where liquid is treated using a radiation source such as an ultraviolet lamp.

The invention will be described with reference to an ultraviolet (UV) lamp but it should be appreciated that other radiation frequencies are also envisaged.

BACKGROUND ART

It is essential for health and hygiene purposes that water and other consumable liquids are at least partially sterilised or otherwise treated prior to consumption.

One type of treatment involves the use of heat to sterilise any bacteria in the liquid, but treatment of large volumes of liquids using heat is energy intensive and requires large heaters and other capital equipment.

Chemical sterilisation is also known and used, but some chemicals interfere with certain types of liquids (i.e. beverages), and the public does not wish to consume large amounts of chemically treated liquids.

Apart from consumable liquids, sterilisation for hygiene purposes is also required in the sewerage industry and for treatment of effluent, grey water and the like.

Certain pharmaceutical and medicinal preparations and also liquid-based and require sterilisation before injection or consumption.

It is known to treat liquids using sterilising gases. One type of sterilising gas is highly reactive ozone gas. Ozone is however toxic and great care must be taken to ensure that the ozone levels in the liquid are not exceeded. Certain sensitive liquids such as milk or some pharmaceutical preparations may also be adversely affected by reactive gases. The generation of ozone reqires fairly expensive equipment and a fairly high input of energy.

A safer way to treat liquids is to use a radiation source. It has been found that UV radiation is effective in killing bacteria, algae and the like. However, UV sterilising units have to date met with limited success as difficulties have arisen with ensuring that the liquid is fully exposed to the radiation.

To achieve an acceptable level of radiation density in the liquid to be treated, it is known to provide a radiation emitter in the form of a tube which sits inside of a larger tube or housing through which liquid flows. The liquid therefore flows about the tube containing the radiation emitter and the radiation can pass into the liquid.

However, when treating grey water, effluent, waste water, bore water, or other liquids containing salts and impurities, it is found that the impurities form a scale on the surface of the UV emitter which greatly reduces the radiation density in the liquid.

Because of the difficulties associated with scale or impurity build up on the radiation emitter, the use of this type of technique to sterilise water has not found wide commercial success.

European patent specification 467465 describes a steriliser having a number of parallel tube-like lamps. The lamps are scraped clean by a scraper which is secured to a supporting plate. The plate is reciprocated along the length of the tubes via a drive motor mounted in the box. This arrangement clumsy and complex and requires the existence of motors and a power source. This specification does not disclose a cleaning device which is moved by the flow of liquid passing through the passageway.

European patent specification 648711 describes a UV radiation apparatus again having cleaning devices which are moved up and down using pull cables. Complicated signalling means are present to signal when the cleaning rings are at the end of the treatment stretch. This arrangement is again complex, expensive and requires physical driving devices.

International patent application WO 94/20208 describes radiation treatment of a flowing fluid. The treatment apparatus has a cleaning sleeve which moves between a retracted position where the fluid source is exposed to a flow of fluid to be treated, and an extended position in which the sleeve covers the source. The sleeve defines a chamber surrounding the source in the extended position and is supplied with a cleaning solution for removing undesired materials. In this arrangement, a separate cleaning solution is required to clean the UV lamps.

Soviet Union patent specification 1669869 describes a water treatment apparatus having a scraper cleaner which is attached to a rod and where the rod is lifted up and down to manually scrape the lamp. In this arrangement, the cleaning device is unable to move and clean the emitter by the flow of liquid passing through the passageway.

German patent specification 3710-250-A describes a UV water sterilising device where a cleaning brush moves along the lamp but requires a feed screw and a reversible motor to move the brush in both directions.

German patent specification 4225630 describes a self-cleaning oxidation chamber having a complicated wiper system to clean the tubes. The wiper system has one wiper unit on a plane at right angles to the first tube and a second wiper unit on a second plane at right angles to the tube axis, with an elastic linkage to hold both wipers from each other when relaxed but giving elastic pliability under pulling or compression tension. The wipers act as a piston when fluid pressure bears on them in the tube with the first wiper being denser than the second wiper. This arrangement is extremely complex and does not lend itself to simple reliable action.

OBJECT OF THE INVENTION

The present invention is directed to an apparatus which can improve the efficiency of the use of radiation to treat liquid by reducing or possibly eliminating build up of scale or other impurities on the radiation emitter. The present invention is also directed to an apparatus which can provide a more efficient passage of liquid around the radiation emitter.

In one form, the invention resides in an apparatus for treating a liquid, the apparatus comprising:

a housing having a liquid inlet, a liquid outlet, and a passageway through which liquid can flow;

a radiation emitter which has a radiation transparent window to allow radiation to pass into and treat the liquid passing through the passageway; and a cleaning device which cleans at least part of the window at periodic intervals.

Throughout the specification and claims, the term "comprising" is not meant to be used in a limiting form and is meant to include an apparatus having at least the features listed but the term "comprising" is not meant to limit the apparatus to only those features.

In another form, the invention resides in an apparatus for treating a liquid, the apparatus comprising:

a housing having a liquid inlet, a liquid outlet, and a passageway through which liquid can flow;

a radiation emitter which has a radiation transparent window to allow radiation to pass into and treat the liquid passing through the passageway, the housing having means to cause the liquid to adopt a spiral flow about the radiation emitter.

The apparatus can be used to treat liquids such as water including drinking water, bore water, pool water, grey water, effluent and sewerage; although other types of liquids are also envisaged such as beverages (i.e. beer, wine and the like).

The housing may be configured such that the passageway is of a sufficient length and/or cross-section to allow the desired amount of liquid to flow through the passage while still being treated for an acceptable period of time. The resident time of the liquid in the passageway which is treated by the radiation emitter can vary depending on the degree of sterilisation required, the type of liquid, and the type of radiation emitter.

Typically, the housing is elongate having a liquid inlet adjacent one end and a liquid outlet adjacent the other end with the housing being substantially hollow to define the passageway through which the liquid can flow.

The type of radiation emitter can vary depending on the type of liquid to be treated. For liquids which are substantially clear (i.e. water, beer, white wine), the radiation emitter can comprise a UV light. For other types of liquids, a different type of radiation emitter can be used provided that the radiation is of the type to treat the liquid for instance by reducing the bacterial count.

Typically, the radiation emitter is a UV light. The UV light is normally an assembly comprising an outer glass cylindrical thimble in which the UV lamp is inserted. The thimble is sealed and presents an outer protective UV transparent wall.

To ensure maximum amount of radiation contact with the liquid, it is preferred that the UV light is positioned in the passageway and substantially in the middle of the passageway such that liquid can flow around and about the UV light. A number of radiation emitters can be placed in the housing and the position of the radiation emitters can be varied to suit the type of liquid to be treated.

The cleaning device is used to clean the window of the radiation emitter at periodic intervals. If the radiation emitter is a light assembly comprising the outer thimble, the cleaning device can function to clean the walls of the outer thimble, which comprises the window.

In one form, the cleaning device moves across the window and is actuated by the flow of liquid through the passageway. In this form, no springs or power supply is required to move the cleaning device across the window.

If the radiation emitter is a tube, the cleaning device can comprise a collar or turbine which extends about the tube and can move along the tube with the flow of water.

It is preferred that the housing is in a substantially upright or upwardly angled position and that the cleaning device is freely movable over the radiation emitter such that the cleaning device naturally falls under the influence of gravity to a lower portion of the housing. Once liquid is passed into the housing, the liquid pushes the cleaning device up and along the radiation emitter to wipe it clean. It is preferred that the cleaning device can pass to a position above the liquid outlet under the influence of liquid flow such that it does not present an appreciable barrier to movement of liquid through the passageway.

BRIEF DESCRIPTION OF THE DRAWINGS

An embodiment of the invention will be described with reference to the following drawings in which.

BEST MODE

Figure 1:
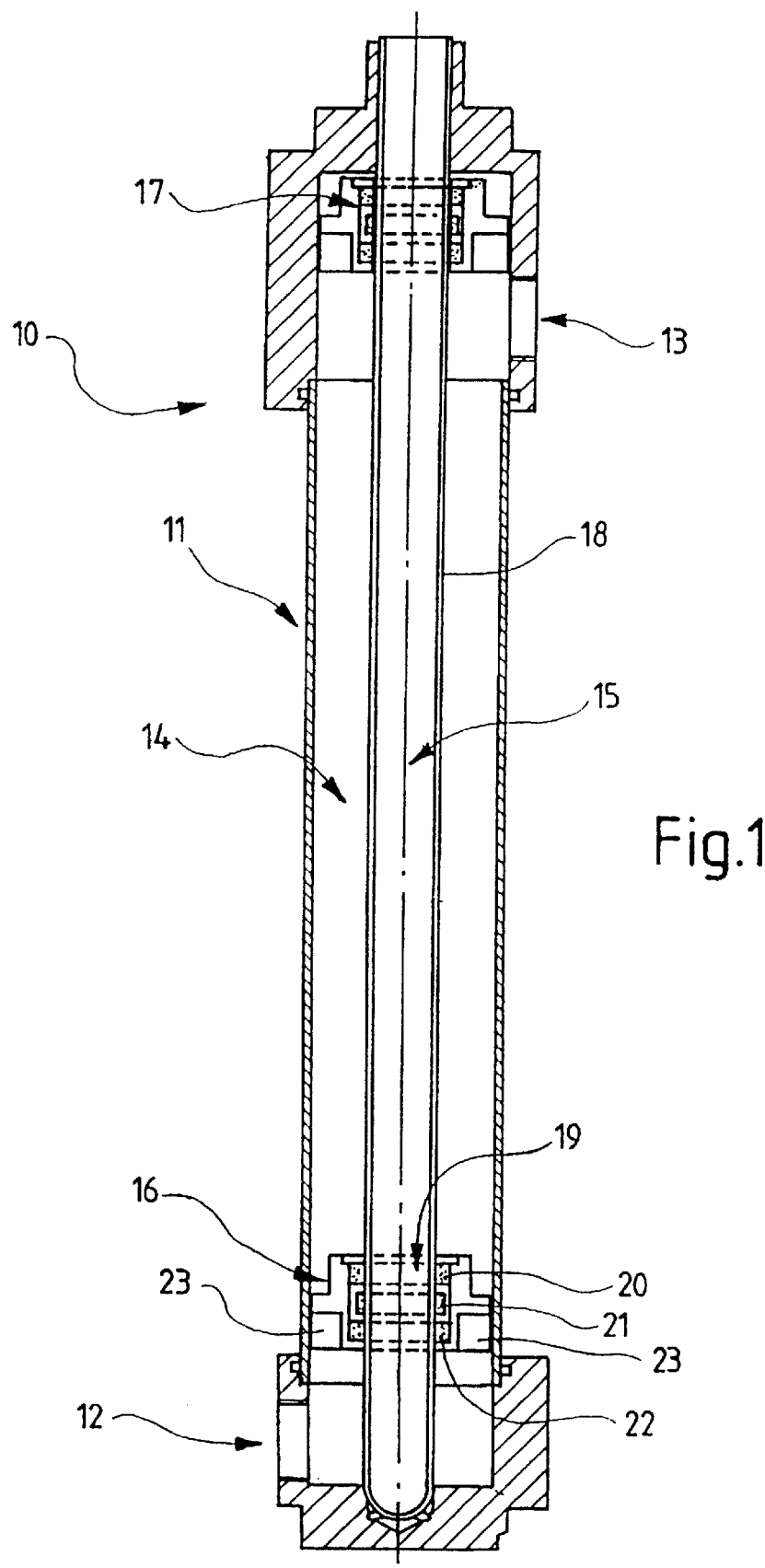
FIG. 1 shows an apparatus for treating a liquid according to an embodiment of the invention.

Referring to FIG. 1, there is shown an apparatus 10 for treating a liquid, the apparatus having a housing 11 which is formed with a lower liquid inlet 12 and an upper liquid outlet 13, an internal passageway 14 though which the liquid can flow, a radiation emitter 15 in the form of a UV light and a cleaning device which is shown in a lower rest position 16 and an upper position 17.

Housing 11 in the embodiment is formed from an aluminium cylindrical tube which can be of any suitable length but typically will be between 50–200 cm. The tube can have any suitable diameter depending on the volume of liquid etc. and a typical internal diameter will be between 4–20 cm.

In the embodiment, housing 11 is positioned in a substantially vertical manner such that inlet 12 is at a lowermost position while outlet 13 is adjacent an uppermost position. Liquid (for instance water) flows through the lower inlet and vertically upward through the housing and out the upper outlet. The housing, being hollow, has a large internal passage of cylindrical design and the UV light 15 is positioned centrally within the passageway such that water can flow about the light 15.

In the embodiment, inlet 12 and outlet 13 are positioned diametrically opposite to each other. Water is passed through inlet 12 at reasonable pressures which will cause the water to adopt a vortex or spiral-like motion as it travels up passageway 14 and through outlet 13. The spiral motion can be encouraged by vanes or deflectors (not shown) in the passageway.

It is found that the vortex or swirling motion provide better contact of the liquid with the UV radiation and provides a better sterilising action.

The UV light 15 is formed as a sealed assembly consisting of an outer cylindrical glass thimble 18 (this could be formed from quartz or optically clear plastic) in which the UV lamp is positioned. Thimble 18 is sufficiently long to extend above outlet 13 as is illustrated in FIG. 1.

The cleaning device in the embodiment comprises a substantially cylindrical collar or turbine which extends about thimble 18 and can freely slide along the thimble between a lower position 16 and an upper position 17. The turbine has a central bore 19 which is lined with cleaning devices 20–22 which in the embodiment are felt pads or seals (it should be appreciated that other cleaning devices could be used). The diameter of bore 19 is such that the felt cleaning devices 20–22 rub against the outer wall of thimble 18 as the cleaning device moves from its lower position 16 to its upper position 17.

The cleaning device is provided with radially extending blades 23 which cause the cleaning device to rotate as it moves along thimble 18 (hence, it can be seen as a turbine).

The cleaning device is moved from its lower position 16 to its upper position 17 by the force of water or other liquid passing through the passageway 14. The liquid strikes blades 23 and causes the turbine to rotate. The rotation provides a better more efficient wiping or cleaning of thimble 18.

In the upper position 17, the turbine is above outlet 13 and as long as water or other liquid flows through the passageway 14, turbine 17 will be pushed into its upper position. When the water flow stops, turbine 17 will fall under gravity back to its lower position 16 and will again wipe and clean thimble 18.

It can be seen that this arrangement provides a simple yet reliable periodic cleaning of the UV lamp to provide maximum efficiency in treating the water or other liquid flowing through the passageway 14. It should be noted that even a thin film of scale on thimble 14 can cause up to a 20% reduction in the kill rate of bacteria in the water.

It should be appreciated that various other changes and modifications can be made to the embodiment without departing from the spirit and scope of the invention as claimed.

What is claimed is:

1. An apparatus for treating a liquid, the apparatus comprising:
   a housing having:
      an internal passageway through which the liquid can flow,
      an outlet, and an inlet, the outlet and the inlet communicating with the internal passageway,
      a radiation emitter comprising an elongate tube within said internal passageway and between said outlet and said inlet, the elongate tube having an upper end and a lower end,
      a cleaning device moveable along and for periodic cleaning the elongate tube, the cleaning device being heavier than the liquid passing through the internal passageway such that the cleaning device will naturally fall under gravity from the upper end of the elongate tube to the lower end of the elongate tube, the cleaning device comprising:
         a body,
         a passageway extending through the body to define an internal wall of the body, the elongate tube passing through the passageway such that the cleaning device is slideable along the elongate tube,
         cleaning means provided on the internal wall of the body to clean the wall of the elongate tube,
         at least one liquid flow passage extending through the cleaning device, the liquid flow passage having a turbine surface which is angled relative to the flow of water through the internal passageway to impart a rotational force to the cleaning device as liquid flows through the flow passage.

2. The apparatus of claim 1, wherein the internal passageway has an upper portion which is above the outlet, the upper portion being sized to accommodate the cleaning device, the cleaning device being moveable into the upper position when liquid passes through the internal passageway and a lower portion which supports the cleaning device when the flow of liquid is stopped, the lower portion supporting the cleaning device above the inlet.

3. The apparatus of claim 2, wherein the cleaning device moves under the influence of gravity to a lower position which is above the inlet of the housing.

4. The apparatus of claim 3, wherein the turbine surface in the liquid flow passage comprises a radially extending blade.

5. The apparatus of claim 4, wherein a plurality of radially extending blades are provided to define a plurality of liquid flow passages.

6. The apparatus of claim 5, wherein the cleaning device has an outer edge which is closely spaced from an inner wall of the internal passageway such that fluid is caused to flow through at least one liquid flow passage.

7. The apparatus of claim 6, wherein the cleaning means comprises felt pads.

8. The apparatus of claim 6, wherein the internal passageway is cylindrical, and the elongate tube of the radiation emitter comprises a cylindrical tube which is positioned centrally within the passageway.

9. The apparatus of claim 8, wherein the inlet and the outlet are at positions diametrically opposite to each other.

10. The apparatus of claim 9, wherein the liquid flow does not reverse in the apparatus.

11. An apparatus for treating a liquid, the apparatus comprising:
    a housing having:
       an internal passageway through which the liquid can flow,
       an outlet, and an inlet, the outlet and the inlet communicating with the internal passageway,
       a radiation emitter comprising an elongate tube within said internal passageway and between said outlet and said inlet, the elongate tube having an upper end and a lower end,
       a cleaning device moveable along and for periodic cleaning the elongate tube, the cleaning device being heavier than the liquid passing through the internal passageway such that the cleaning device will naturally fall under gravity from the upper end of the elongate tube to the lower end of the elongate tube, the cleaning device comprising:
          a body,
          a passageway extending through the body to define an internal wall of the body, the elongate tube passing through the passageway such that the cleaning device is slideable along the elongate tube,
          cleaning means provided on the internal wall of the body to clean the wall of the elongate tube, and
          blades attached to the cleaning device having outer edges which are closely spaced from an inner wall of the internal passageway such that fluid is caused to flow through at least one liquid flow passage causing the body to rotate.

12. The apparatus of claim 11, wherein said cleaning means are felt pads.

* * * * *